(12) United States Patent
Kanniah et al.

(10) Patent No.: US 12,450,015 B1
(45) Date of Patent: Oct. 21, 2025

(54) METHOD FOR PERFORMING DATA READ OPERATION AND A STORAGE DEVICE THEREOF

(71) Applicant: SAMSUNG ELECTRONICS CO., LTD., Suwon-si (KR)

(72) Inventors: Pandi Kanniah, Bengaluru (IN); Ashok Navneethan Arumugam, Bengaluru (IN); Ayyanar Ponnusamy Gangheyamoorthy, Bengaluru (IN); Srinivas Sridhara, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/812,386

(22) Filed: Aug. 22, 2024

(30) Foreign Application Priority Data

May 31, 2024 (IN) .............................. 202441042327

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ...................................................... G06F 3/06
See application file for complete search history.

(56) References Cited

U.S. PATENT DOCUMENTS

| | | | |
|---|---|---|---|
| 10,790,035 B2 | 9/2020 | Choi et al. | |
| 10,963,335 B2 | 3/2021 | Yang | |
| 11,461,177 B2 | 10/2022 | Lee | |
| 2015/0301885 A1* | 10/2015 | Yuan | G11C 16/10 714/807 |
| 2016/0132256 A1* | 5/2016 | Jung | G06F 12/0246 711/103 |
| 2019/0325969 A1* | 10/2019 | Hong | G06F 11/1048 |
| 2020/0160906 A1* | 5/2020 | Lee | G06F 11/141 |
| 2021/0109807 A1* | 4/2021 | Papandreou | G06F 11/1048 |

* cited by examiner

*Primary Examiner* — Khoa D Doan
(74) *Attorney, Agent, or Firm* — Sughrue Mion, PLLC

(57) ABSTRACT

A method for performing data read operation on a storage device, includes: based on receiving a command from a host device, generating a read request using a first layer associated with the storage device, wherein the read request includes at least one memory physical parameter, a default read offset, and at least one retry read offset; communicating, via a memory interface layer, the read request to a second layer associated with the storage device; performing a default read operation in the second layer based on the at least one memory physical parameter and the default read offset; detecting a first error status of the read request during the default read operation in the second layer; and based on the first error status of the read request indicating the first uncorrectable error, performing a retry read operation in the second layer using a retry read offset.

20 Claims, 5 Drawing Sheets

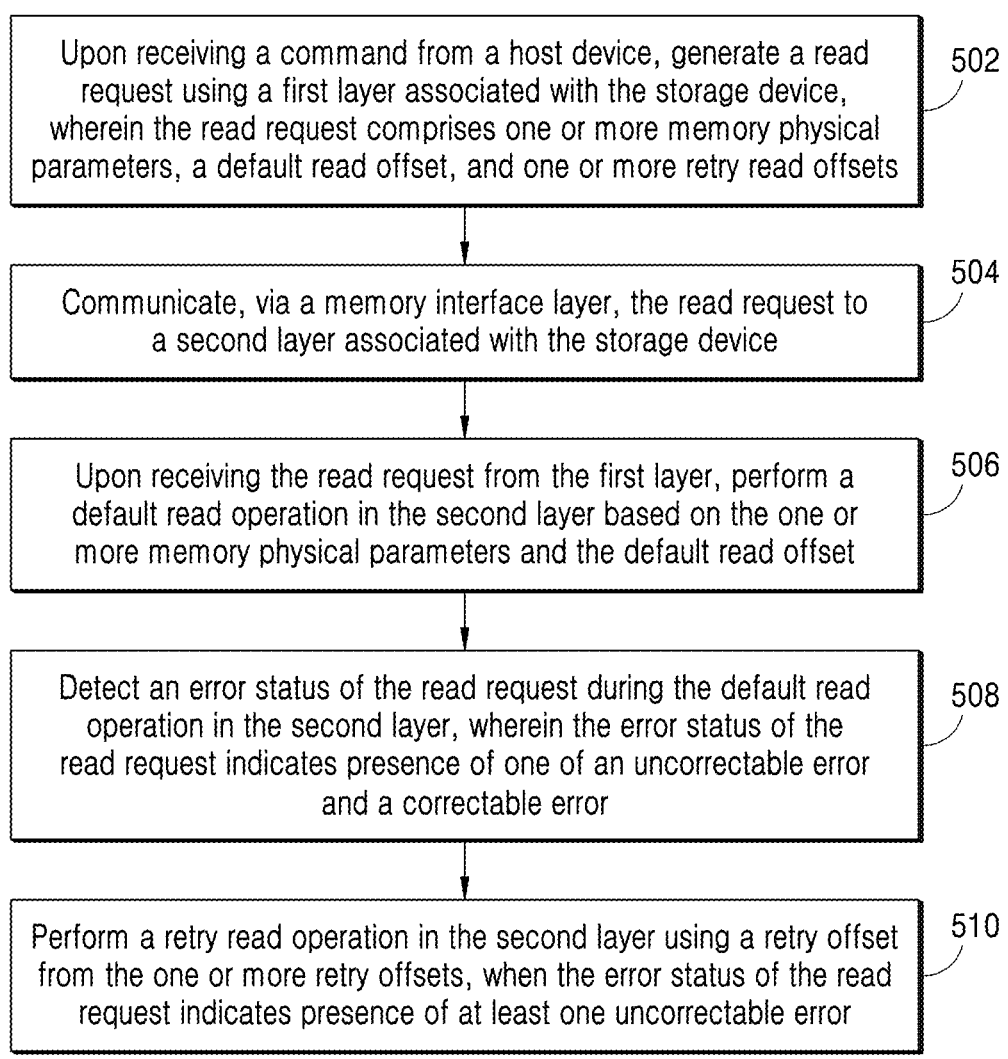

METHOD FOR PERFORMING DATA READ OPERATION AND A STORAGE DEVICE THEREOF

CROSS-REFERENCE TO RELATED APPLICATION(S)

This application claims priority to Indian Patent Application number 202441042327 filed in the Indian Patent Office on May 31, 2024, in the Indian Patent Office, the content of which is incorporated by reference herein in its entirety.

BACKGROUND

The present disclosure relates to a method for performing data read operation on a storage device (e.g., V-NAND flash memory).

A Vertical-NAND (V-NAND) is a flash memory device. The V-NAND stacks NAND memory dies/layers vertically on top of one another. The memory dies/layers are interconnected through memory interface layers. The stacking of the NAND memory dies on top of one another increases the flash memory device's height and consequently, increases storage capacity. The future V-NAND flash memory device may comprise more layers stacked up and, also, a chip may be fabricated using smaller nano meter (nm) technology.

In the storage device, a memory retention is a main function where a user copy/write data to the storage device and may subsequently read the stored data later. Since the data is stored for a longer time, while reading the data there may be a retention impact on the storage device. As a result, a raw bit error rate (RBER) is increased in the storage device and a normal read or a default read may not be able to correct the retention impact. As a result, a recovery read may be performed. This recovery read may require a larger time to read the data. Accordingly, there may be multiple read operations (retry read) for reading the data. The RBER and multiple retry read operations reduce read performance of the storage device. Consequently, the drop in read performance due to multiple retry read operations degrades Quality of Service (QOS) read latency of the flash storage device.

Thus, there exists a need for further improvements in performing read retry on the storage to avoid performance drop and improve the QOS read latency.

The information disclosed in this background section is only for enhancement of understanding of the general background of embodiments of the disclosure and should not be taken as an acknowledgement or any form of suggestion that this information forms the prior art already known to a person skilled in the art.

SUMMARY

According to an aspect of an example embodiment, a method for performing data read operation on a storage device, includes: based on receiving a command from a host device, generating a read request using a first layer associated with the storage device, wherein the read request includes at least one memory physical parameter, a default read offset, and at least one retry read offset; communicating, via a memory interface layer, the read request to a second layer associated with the storage device; based on receiving the read request from the first layer, performing a default read operation in the second layer based on the at least one memory physical parameter and the default read offset; detecting a first error status of the read request during the default read operation in the second layer, wherein the first error status of the read request indicates a first uncorrectable error or a first correctable error; and based on the first error status of the read request indicating the first uncorrectable error, performing a retry read operation in the second layer using a retry read offset from among the at least one retry read offset.

According to an aspect of an example embodiment, a storage device includes: a memory; and a storage controller operatively coupled to the memory, the storage controller being configured to: based on receiving a command from a host device, generate a read request using a first layer associated with the storage device, wherein the read request includes at least one memory physical parameter, a default read offset, and at least one retry read offset, communicate, via a memory interface layer, the read request to a second layer associated with the storage device, based on receiving the read request from the first layer, perform a default read operation in the second layer based on the at least one memory physical parameter and the default read offset, detect a first error status of the read request during the default read operation in the second layer, wherein the first error status of the read request indicates a first uncorrectable error or a first correctable error, and based on the first error status of the read request indicating the first uncorrectable error, perform a retry read operation in the second layer using a retry read offset from among the at least one retry read offset.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 depicts a flow chart illustrating a method 500 for performing data read operation on a storage device, in accordance with one or more embodiments.

DETAILED DESCRIPTION

Figure 1:
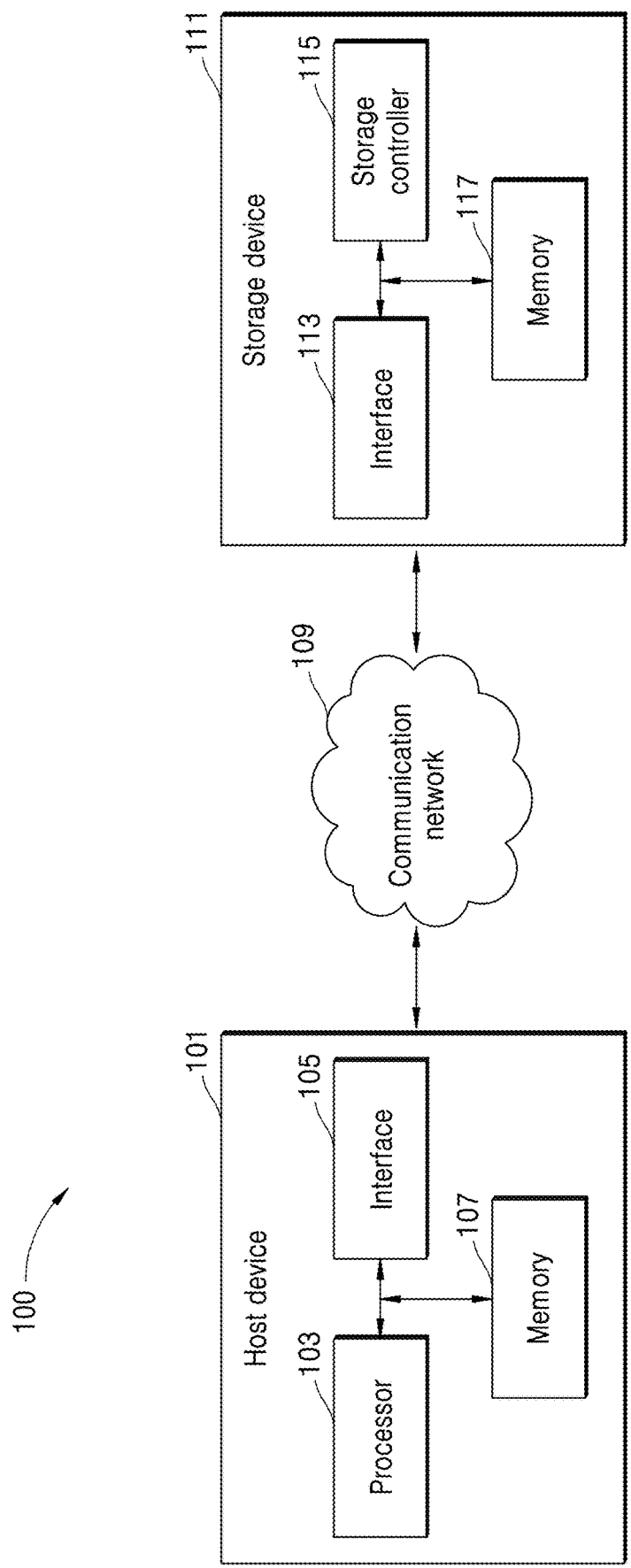
FIG. 1 shows an example environment where a host device is performing data read operation on a storage device, in accordance with one or more embodiments.

Referring now to the drawings, there is shown an illustrative embodiment of the disclosure. It is understood that the disclosure is susceptible to various modifications and alternative forms; specific embodiments thereof have been shown by way of example in the drawings and will be described in detail below. It will be appreciated as the description proceeds that the disclosure may be realized in different embodiments.

It should be appreciated by those skilled in the art that any block diagrams herein represent conceptual views of the illustrative systems embodying the principles of one or more example embodiments. Similarly, it will be appreciated that any flowcharts, flow diagrams, state transition diagrams, pseudo code, and the like represent various processes which may be substantially represented in computer readable medium and executed by a computer and/or processor, whether or not such computer and/or processor is explicitly shown.

The terms "comprise(s)", "comprising", "include(s)" or any other variations thereof, are intended to cover a non-exclusive inclusion, such that a setup, device that comprises a list of components that does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus or device. The terms like "at least one" and "one or more" may be used interchangeably or in combination throughout the description. The terms like "a plurality of" and "multiple" may be used interchangeably or in combination throughout the description.

In the related art techniques of reading the data from the storage device, a host device transmits a read request. The storage device comprises multiple layers (an application layer and a hardware layer or memory manager). The read request is received by the application layer of the storage device and may perform normal, or default read operation. The application layer may issue read command to the hardware layer through interface layer. During the default read operation, the read command is processed in the hardware layer and the data out (Dout) command is transmitted to the application layer through the memory interface layer. Specifically, the hardware layer may comprise an Error Correction Code (ECC) engine, the data request is processed, and error status is identified, and the Dout command is transmitted to the application layer. The application layer creates a retry read operation request and transmits the read retry request to the hardware layer. This process takes larger time to allow the host device to read the storage device since the multiple layers are involved in reading the data. Accordingly, the read performance is degraded and the Quality of Service (QOS) of the storage device is reduced. Also, in the related art techniques, the retry read requests are performed at lower priority as the storage device identifies that there is no necessity of prioritizing the retry read request.

To solve some or all of the above-identified problems, the present disclosure techniques performs data retry read operation in the hardware layer associated with the storage device instead of the application layer, thereby improving read latency while reading the data and efficiently improving the read performance of the storage device and subsequently, improving the QoS of the storage device.

FIG. 1 shows an example environment 100 where a host device 101 is performing data read operation on a storage device 111, in accordance with one or more embodiments.

The example environment 100 may comprise a host device 101 in communication with a storage device 111 through a communication network 109. As an example, the host device 101 may be, without limitation, a mobile phone, a smartphone, a tablet, a computer or desktop, a laptop, a personal digital assistant (PDA), a server, and the like. The host device 101 may include at least one processor 103 communicatively coupled with a memory 107. The host device 101 may also include an interface 105 to transmit or receive the data. Similarly, the storage device 111 may include a storage controller 115 communicatively coupled with a memory 117. The storage device 111 may include, without limitation, a Vertical-NAND (V-NAND) or Solid-State Drive (SSD) memory card, a NAND flash memory, and the like.

The processor 103 may include one or more memory controllers (not shown in FIG. 1). The memory 107 may include, without limitation, at least one Volatile Memory (VM) and/or at least one Non-Volatile Memory (NVM), etc. As an example, the VMs may include, without limitation, a Random Access Memory (RAM), a cache memory, and the like.

The communication network 109 may comprise a data network such as, but not restricted to, the Internet, a Local Area Network (LAN), a Wide Area Network (WAN), and/or a Metropolitan Area Network (MAN), etc. In certain example embodiments, the communication network 109 may include a wireless network, such as, but not restricted to, a cellular network, and/or a satellite network, etc., and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS), etc. In at least one example embodiment, the communication network 109 may include or otherwise cover networks and/or subnetworks, each of which may include, for example, a wired and/or wireless data pathway. The communication network 109 may comprise servers, routers, bridges, switches, and/or other similar equipment used to facilitate communication between the host device 101 and the storage device 111.

Figure 4:
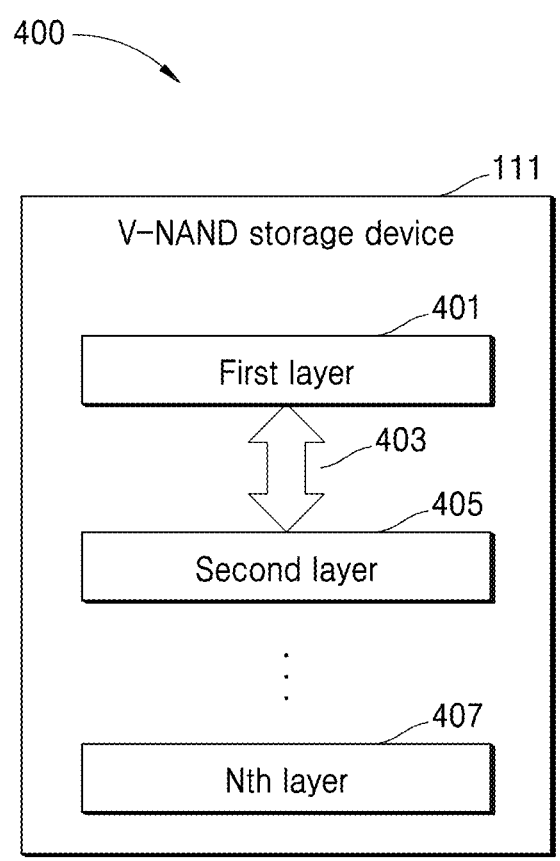
FIG. 4 shows a vertical NAND storage device architecture with multiple layers and connectivity between the layers, in accordance with one or more embodiments.

In FIG. 1, the host device 101 may transmit a command, for example, a read command to the storage device 111 through the communication network 109. The storage controller 115 receives the command from the host device 101 and generates a read request for reading the data/file associated with the storage device 111. The read request may comprise both default read and retry read requests. Specifically, the storage device 111 may comprise multiple layers, for example, a first layer (also known as software layer or application layer) and a second layer (also known as a hardware layer or memory manager). The first layer and second layer are interconnected through a memory interface layer and the read command is communicated between the two layers, as shown in FIG. 4. The first layer associated with the storage device 111 may include a firmware that generates the read request to the second layer. The first layer associated with the storage controller 115 may add one or more memory physical parameters, a default read offset, and one or more retry read offsets to the read request. Generally a read offset may be a voltage value used to adjust a read voltage. For example, the one or more memory physical parameters and the default read offset may be added during the default read operation. Similarly, the one or more memory physical parameters and one or more retry read offsets may be added during the retry read operation and/or another retry read operation. The one or more physical parameters may include information pertaining to chip, die, bank, block, page, and the like. The host device 101 may share the logical address for reading the file or data. The firmware within the first layer of the storage device 111 may generate a corresponding physical address (such as chip, die, bank, block, and page) for the file/data.

After generating the read request, the storage controller 115 may communicate the read request to the second layer associated with the storage device 111. The storage controller 115 may communicate the read request to the second layer through the memory interface layer as shown in FIG.

4. After receiving the read request from the first layer, the second layer (or memory manager) associated with the storage controller 115 initially performs a default read operation in the second layer based on the one or more memory physical parameters and the default read offset. The default read operation may be a normal read operation where the host device 101 normally performs the operation of reading the data from the storage device 111.

During the default read operation, the storage controller 115 may detect an error status of the read request during the default read operation in the second layer. Specifically, to detect the error status of the read request during the default read operation, the storage controller 115 reads the data from the storage device 111 by issuing a data output command (from the second layer) to an Error Correction Code (ECC) engine from the second layer of the storage device 111. The ECC engine is a hardware engine and present in the input/output (I/O) path of the memory interface layer of the storage device 111. When the read or write operation is performed the data may be moved from the first layer to the second layer through the ECC engine in the storage device 111, and the second layer processes the request/data and passes the processed data to the first layer through the same ECC engine. The data passed through the second layer to the first layer may be '0' or '1'. The ECC engine of the storage device 111 may include an internal logic. Based on a pattern of the data, the ECC engine detects the number of bit flips in the data which is read from the storage device 111. If the number of bit flips in the data is greater than a threshold number then the storage controller 115 determines that the error status of the read request indicates an uncorrectable error. The uncorrectable error status corresponds to a presence of at least one uncorrectable error in the data which is read from the storage device 111. If the number of bit flips in the data are less than or equal to the threshold number then the storage controller 115 may detect the error status of the read request corresponds to a presence of a correctable error. Accordingly, the correctable error is corrected and the read operation is completed.

The storage controller 115 may perform a retry read operation in the second layer using a retry offset from the one or more retry offsets, when the error status of the read request indicates presence of at least one uncorrectable error. For instance, when the ECC engine in the memory interface layer detects that the error status of the read request includes a number of bit flips greater than the threshold number (uncorrectable error status), then the default read operation may be stopped and a retry read operation in the second layer performed using another retry offset from the one or more retry offsets. In one example, the one or more retry read offsets corresponds to one or more page types associated with the storage device 111. Non-limiting examples of page types are a Single Level-Cell (SLC), a Least Significant Bit (LSB), a Central Significant Bit (CSB), an Extended Significant Bit (ESB), and a Most Significant Bit (MSB) page type.

During a retry read operation in the second layer, the storage controller 115 may detect the error status of the read request. The error status of the read request indicates a presence of an uncorrectable error or a correctable error. When the error status of the read request during the retry read operation indicates a presence of an uncorrectable error, then the storage controller 115 may perform another retry read operation in the second layer using another retry offset from the one or more retry offsets.

The retry read operation may be assigned with a high priority when the read request is identified as a retry read request. For instance, the storage controller 115 may identify a completion status of the read retry read operation when the error status of the read request indicates a presence of the uncorrectable error. The storage controller than determines a number of iterations of the retry read operation, when the status of the completion status of the retry read operation indicates that the retry read operation is incomplete. Accordingly, the storage controller 115 may schedule the read retry operation as a high priority operation when the number of iteration are less than a threshold number. Finally, the data read operation by the host device 101 is performed on the storage device 111.

Figure 2:
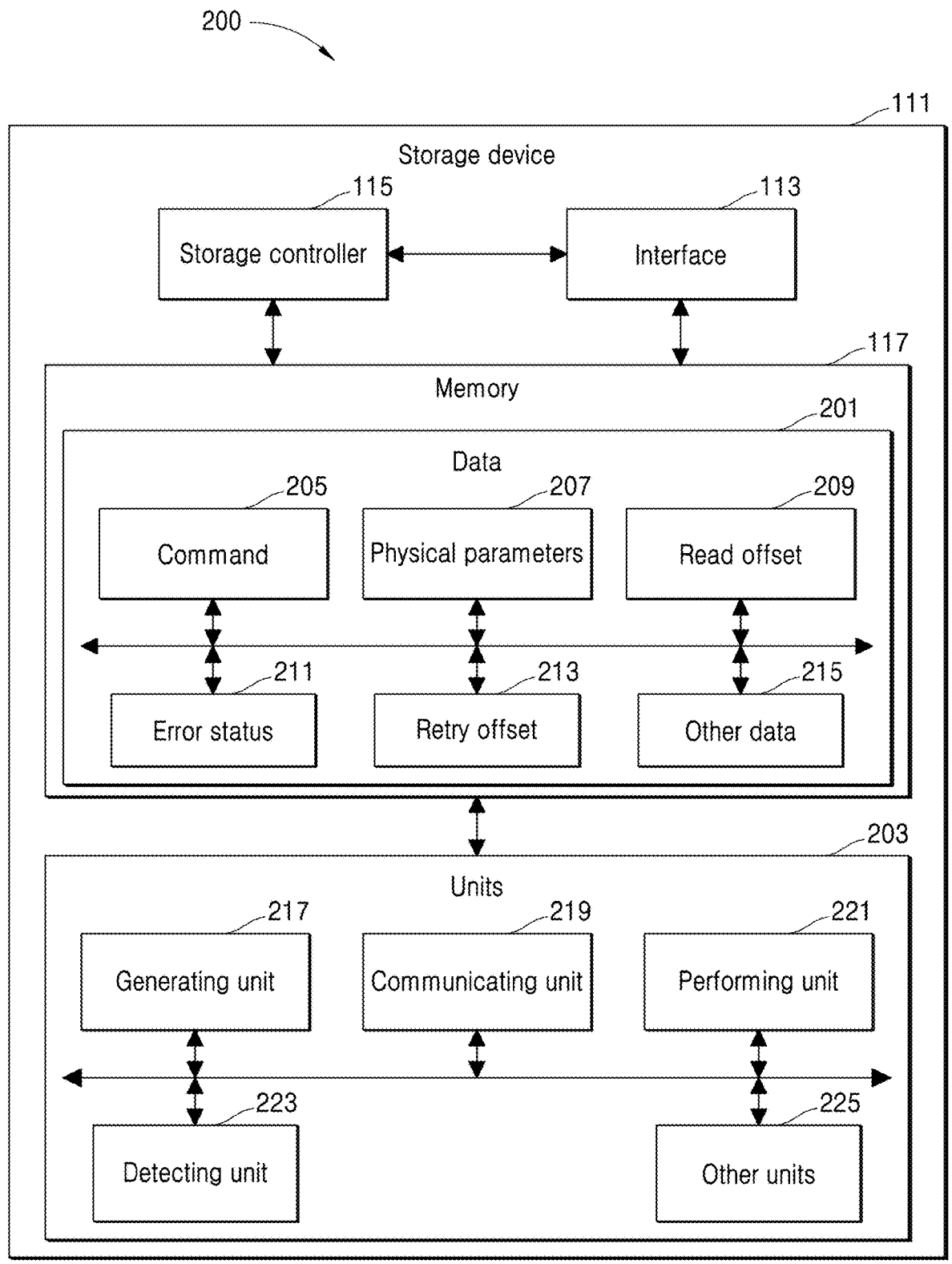
FIG. 2 shows a high-level block diagram of a storage device, in accordance with one or more embodiments.

FIG. 2 shows a high-level block diagram 200 of a storage device 111, in accordance with one or more embodiments. The storage device 111 may comprise the at least one interface 113, the storage controller 115, the memory 117, and/or one or more units 203, etc., but embodiments are not limited thereto, and for example, there may be a greater or lesser number of constituent components included in the storage device 111. The memory 117 may include various types of data 201 including a command 205, one or more physical parameters 207, read offset 209, an error status 211, a retry offset 213 and/or other data 215, etc. The other data 215 may include, for example, one or more files, system data, user data, temporary files, one or more instructions, the desired and/or predefined threshold values, but are not limited thereto.

In an example embodiment, the one or more units 203 include a generating unit 217, a communicating unit 219, a performing unit 221, a detecting unit 223, and/or other units 225. In an example embodiment, the units 203 may be dedicated hardware processing circuits, processing sub-circuits, modules, units, etc., capable of executing one or more instructions stored in the memory 117 for performing various operations of the storage device 111. In another example embodiment, the units 203 may be software modules stored in the memory 117 which may be executed by the storage controller 115 for performing the operations of the storage device 111. According to an example embodiment, the generating unit 217, the communicating unit 219, the performing unit 221, the detecting unit 223, and/or other units 225 may be implemented as processing circuitry, and may include hardware including logic circuits; a hardware/software combination such as a processor executing software and/or firmware; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, and/or an application-specific integrated circuit (ASIC).

In at least one embodiment, the generating unit 217 may be configured to generate a read request using a first layer associated with the storage device 111. The communicating unit 219 may be configured to communicate, via a memory interface layer, the read request to a second layer associated with the storage device 111. The performing unit 221 may be configured to perform a default read operation in the second layer based on the one or more memory physical parameters 207 and the default read offset 209. The detecting unit 223 may be configured to detect an error status 211 of the read request during the default read operation in the second layer, and the performing unit 221 may be configured to perform a retry read operation in the second layer using a retry offset 213 from the one or more retry offsets. The other units 225 may be used to perform various functionalities of the storage device 111. It will be appreciated that the one or more units 203 may be implemented as a single unit or a combination of different units.

Figure 3:
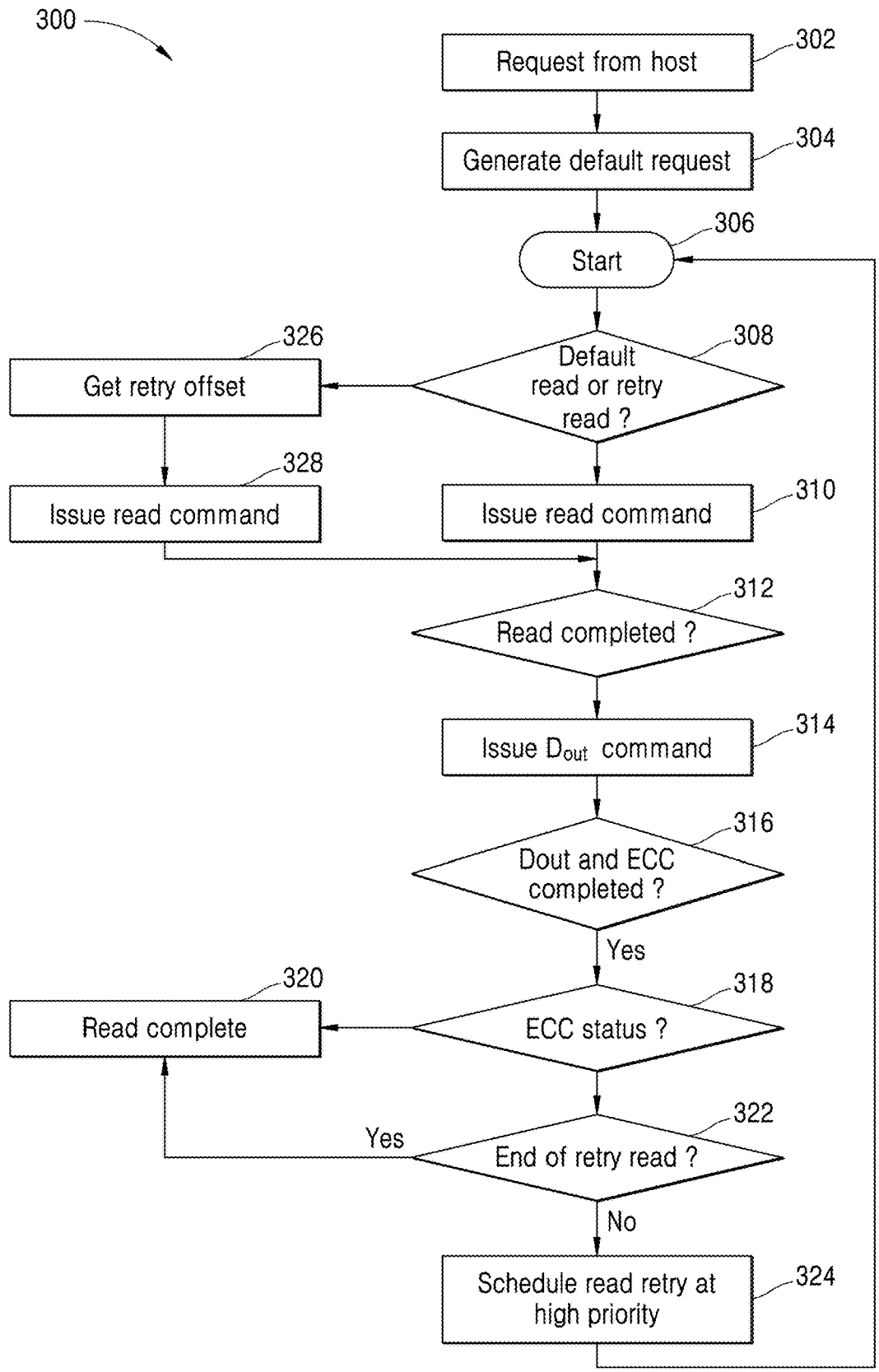
FIG. 3 depicts a flowchart illustrating a method for performing data read operation on a storage device, in accordance with one or more embodiments.

FIG. 3 depicts a flowchart illustrating a method 300 for performing a data read operation on a storage device 111, in accordance with one or more embodiments.

As illustrated in FIG. 3, at block 302, the storage controller 115 may receive request or command 205 from the host device 101. For example, the processor 103 associated with the host device 101 may request a read of data from the storage device 111 and may share the logical address of the file or data that is to be read. At block 304, the storage controller 115 may generate a default request to the second layer using the firmware associated with the first layer. The storage controller 115 may add additional details that are needed for a default read/retry read based on current read page type (Single Level-Cell (SLC)/Least Significant Bit (LSB)/Central Significant Bit (CSB)/Extended Significant Bit (ESB)/Most Significant Bit (MSB)) such as retry offset 213, retry read command, etc. The retry read offset may be obtained from the table shown below.

| Retry iteration | SLC | LSB | CSB | ESB | MSB |
|---|---|---|---|---|---|
| 0 | Default | Default | Default | Default | Default |
| 1 | Read offset 1 | Read offset 1 | Read offset 1 | Read offset 1 | Read offset 1 |
| 2 | Read offset 2 | Read offset 2 | Read offset 2 | Read offset 2 | Read offset 2 |
| ... | ... | ... | ... | ... | ... |
| N | Read offset N | Read offset N | Read offset N | Read offset N | Read offset N |

At block 306 of FIG. 3 the storage controller 115 may initially perform a default read operation as indicated in the block 308. At block 310, the storage controller 115 may issue a read command to the second layer with a default read offset. For example, the request is passed to the second layer from the first layer through memory interface layer. At block 312, the storage controller 115 may verify whether the read is completed or not in the second layer. In other words, the storage controller 115 may move data which has been read into a NAND buffer associated with the second layer. If the read is completed, the storage controller 115 may issue a Dout command to the ECC engine present in the memory interface layer as indicated in the block 314. For example, the data is transferred from the NAND buffer to the ECC engine. The storage controller 115 may verify whether the Dout command and the ECC verification has been completed or not, as indicated in the block 316. If the Dout and ECC verification is completed, the storage controller 115 may verify the ECC status or error status 211 as indicated in the block 318. The maximum number of bit flips which can be corrected is referred to as a threshold number. In rare situations, a number of bit errors may occur which is very high and the data may not be recognized as uncorrectable (for example, it appears that none of the bits have flipped, while actually many have flipped). As a general example of error detection, the ECC engine may determine a number of bit flips in the data which is read from the storage device 111 to determine the error status 211 (also referred to as an ECC status). If the number of bit flips in the data is less than the threshold number then the error status 211 has a value of passed, and the read operation is completed as indicated in the block 320. Alternatively, if the storage controller 115 determines that the error status 211 indicates an uncorrectable error (the data includes a number of bit flips greater than a threshold number, and thus the data is uncorrectable), then the retry read operation is performed by the second layer of the storage device 111. The storage controller 115 may verify whether the retry read operation is completed or not as indicated in the block 322. If the retry read operation is performed or completed, then the storage controller 115 indicates the read has been completed as indicated in the block 320. If the storage controller 115 determines that the retry read is not completed, then the storage controller 115 may schedule the read retry at a high priority as indicated in the block 324.

Subsequently, the operation is moved to the block 306. The storage controller 115 may start performing retry read operation as indicated in the block 308. The first layer associated with the storage controller 115 may get retry offset 213 from the one or more retry offsets as indicated in the block 326 and issue the read command to the second layer of the storage device 111 as indicated in the block 328. The storage controller 115 may check whether the retry read is completed or not in the second layer as indicated in the block 312. If the retry read operation is completed in the second layer, the second layer may issue a Dout command to the ECC engine as indicated in the block 314. At block 316, the storage controller 115, may verify whether the Dout is verified in the ECC engine. The storage controller 115 may determine the ECC status of the retry read request. If the retry read request comprises a number of bit flips less than or equal the threshold number, then the retry read is completed as shown in the block 320. Accordingly, the retry read operation is performed by the host device 101.

FIG. 4 shows a vertical NAND (V-NAND) storage device 111 architecture 400 with multiple layers and connectivity between the layers, in accordance with one or more embodiments.

As shown in FIG. 4, the V-NAND storage device 111 comprises a first layer 401 (also known as application layer or software layer), a second layer 405 (also known as hardware layer or memory manger). In one example, the V-NAND storage device 111 may include more number of layers up to nth layer 407. The first layer 401 may receive the read request from the host device 101 and add one or more memory physical parameters 207, default read offset 209 and retry offset 213 to the read request and transmit the read command to the second layer 405 through a memory interface layer 403. The I/O path of the memory interface layer 403 may include ECC engine (not shown in the FIG. 4) The second layer 405 process the read command and issue the Dout command to the ECC engine. The ECC engine may determine number of bits flips in the data output command and may determine the error status 211 (uncorrectable or correctable) of the read request. Finally, the second layer 405 may perform the retry read based on the error status 211 determined is uncorrectable error status and the retry read is set with a high priority and the data is read by the host device 101.

FIG. 5 depicts a flow chart illustrating a method 500 for performing data read operation on a storage device 111, in accordance with one or more embodiments.

At block 502, upon receiving a command from a host device 101, a read request is generated using a first layer 401 associated with the storage device 111, wherein the read request comprises one or more memory physical parameters 207, a default read offset 209, and one or more retry read offsets. The operations of block 502 may be performed by the storage controller 115 (particularly by the generating unit 217) of FIG. 2.

At block 504, the read request is communicated, via a memory interface layer 403, to a second layer 405 associated with the storage device 111. The operation of block 504 may be performed by the storage controller 115 (particularly by a communicating unit 219) of FIG. 2.

At block 506, upon receiving the read request from the first layer 401, a default read operation in the second layer 405 is performed based on the one or more memory physical parameters 207 and the default read offset 209. The operation of block 506 may be performed by the storage controller 115 (particularly by a performing unit 221) of FIG. 2.

At block 508, an error status 211 of the read request is detected during the default read operation in the second layer 405, wherein the error status 211 of the read request indicates presence of one of an uncorrectable error and a correctable error. The operation of block 508 may be performed by the storage controller 115 (particularly by a detecting unit 223) of FIG. 2.

At block 510, a retry read operation is performed in the second layer 405 using a retry offset 213 from the one or more retry offsets, when the error status 211 of the read request indicates presence of at least one uncorrectable error. The operation of block 510 may be performed by the storage controller 115 (particularly by a performing unit 221) of FIG. 2.

According to one or more embodiments, when the error status is identified or determined as an uncorrectable error status, the second layer associated with the storage device itself performs a retry read operation and does not require passing the read request to the first layer. As a result, embodiments do not require passing the read request across multiple layers, in contrast to requirements of related art techniques. This reducing latency in reading data and read performance is improved.

When the retry read request completion status is incomplete, the storage controller associated with the storage device schedules or sets the retry read request as a high priority and the retry read request is performed quickly. As a result, embodiments provide efficient usage of one read queue to perform multiple retry reads and subsequently, minimize demands on hardware resources. Overall, embodiments reduce the read latency, provide better read performance, and improved quality of service in reading data from the storage device.

According to an embodiment, the above method 500 may be implemented in the general context of computer executable instructions. Generally, computer executable instructions may include routines, programs, objects, components, data structures, procedures, modules, and/or functions, etc., which perform specific functions or implement specific abstract data types.

The order in which the various operations of the methods are described is not intended to be construed as a limitation, and any number of the described method blocks may be combined in any order to implement the method. Additionally, individual blocks may be deleted from the methods without departing from the spirit and scope of the subject matter described herein. Furthermore, the methods can be implemented in any suitable hardware and/or combination of hardware and software and/or firmware, etc.

The various operations of methods described above may be performed by various hardware and/or software component(s) and/or module(s), including, but not limited to the storage controller 115 of FIG. 1 and the various other hardware components of FIG. 2, etc.

In at least one example embodiment, one or more non-transitory computer-readable media may be utilized for implementing one or more of the example embodiments. Certain aspects may comprise a computer program product for performing the operations presented herein. For example, such a computer program product may comprise a non-transitory computer readable media having computer readable instructions stored (and/or encoded) thereon, the computer readable instructions being executable by one or more processors to perform the operations described herein. For certain aspects, the computer program product may include packaging material, but is not limited thereto.

Various components, modules, and/or units are described in this disclosure to emphasize functional aspects of devices configured to perform the disclosed techniques, but do not necessarily require realization by different and/or separate hardware units. Rather, as described above, various units may be combined into a single hardware unit and/or provided by a collection of interoperative hardware units, including one or more processors as described above, in conjunction with suitable software and/or firmware.

What is claimed is:

1. A method for performing data read operation on a storage device, the method comprising:
    based on receiving a command from a host device, generating a read request using a first layer associated with the storage device, wherein the read request comprises at least one memory physical parameter, a default read offset, and at least one retry read offset;
    communicating, via a memory interface layer, the read request to a second layer associated with the storage device;
    based on receiving the read request from the first layer, performing a default read operation in the second layer based on the at least one memory physical parameter and the default read offset;
    detecting a first error status of the read request during the default read operation in the second layer, wherein the first error status of the read request indicates a first uncorrectable error or a first correctable error; and
    based on the first error status of the read request indicating the first uncorrectable error, performing a retry read operation in the second layer using a retry read offset from among the at least one retry read offset.

2. The method of claim 1, further comprising:
    detecting a second error status of the read request during the retry read operation in the second layer, wherein the second error status of the read request indicates a second uncorrectable error or a second correctable error; and
    based on the second error status of the read request during the retry read operation indicating the second uncorrectable error, performing another retry read operation in the second layer using another retry read offset from among the at least one retry read offset.

3. The method of claim 1, wherein detecting the first error status of the read request during the default read operation comprises:
    reading data from the storage device by issuing a data output command to an Error Correction Code (ECC) engine from the second layer of the storage device;
    determining, using the ECC engine, a number of bit flips in the data which is read from the storage device;
    based on the number of bit flips being greater than a threshold number, detecting the first error status of the read request as a first uncorrectable error status, wherein the first uncorrectable error status indicates the first uncorrectable error in the data which is read from the storage device; and based on the number of bit flips being less than or equal to the threshold number, detecting the first error status of the read request as a first correctable error status, wherein the first correctable error status indicates the first correctable error in the data which is read from the storage device.

4. The method of claim 1, further comprising scheduling the retry read operation as a high priority operation by:

based on the first error status of the read request indicating presence of at least one uncorrectable error, identifying a completion status of the retry read operation;

based on the completion status of the retry read operation indicating that the retry read operation is incomplete, determining a number of iterations of the retry read operation; and based on the number of iterations being less than a threshold number, scheduling the retry read operation as the high priority operation.

5. The method of claim 1, wherein the first layer comprises an application layer, and wherein the second layer comprises at least one memory manager.

6. The method of claim 1, wherein the at least one retry read offset corresponds to at least one page type associated with the storage device.

7. The method of claim 6, wherein the at least one page type includes at least one of Single Level-Cell (SLC), Least Significant Bit (LSB), Central Significant Bit (CSB), Extended Significant Bit (ESB) and Most Significant Bit (MSB).

8. A storage device comprising:

a memory; and a storage controller operatively coupled to the memory, the storage controller being configured to:

based on receiving a command from a host device, generate a read request using a first layer associated with the storage device, wherein the read request comprises at least one memory physical parameter, a default read offset, and at least one retry read offset, communicate, via a memory interface layer, the read request to a second layer associated with the storage device, based on receiving the read request from the first layer, perform a default read operation in the second layer based on the at least one memory physical parameter and the default read offset, detect a first error status of the read request during the default read operation in the second layer, wherein the first error status of the read request indicates a first uncorrectable error or a first correctable error, and based on the first error status of the read request indicating the first uncorrectable error, perform a retry read operation in the second layer using a retry read offset from among the at least one retry read offset.

9. The storage device of claim 8, wherein the storage controller is further configured to:

detect a second error status of the read request during the retry read operation in the second layer, wherein the second error status of the read request indicates a second uncorrectable error or a second correctable error; and based on the second error status of the read request during the retry read operation indicating the second uncorrectable error, perform another retry read operation in the second layer using another retry read offset from among the at least one retry read offset.

10. The storage device of claim 8, wherein to detect the first error status of the read request during the default read operation, the storage controller is further configured to:

read data from the storage device by issuing a data output command to an Error Correction Code (ECC) engine from the second layer of the storage device;

determine, using the ECC engine, a number of bit flips in data which is read from the storage device;

based on the number of bit flips being greater than a threshold number, detect the first error status of the read request as a first uncorrectable error status, wherein the first uncorrectable error status indicates the first uncorrectable error in the data which is read from the storage device; and based on the number of bit flips being less than or equal to the threshold number, detect the first error status of the read request as a first correctable error status, wherein the first correctable error status indicates the first correctable error in the data which is read from the storage device.

11. The storage device of claim 8, wherein the storage controller is further configured to schedule the retry read operation as a high priority operation, and wherein to schedule the retry read operation as the high priority operation, the storage controller is further configured to:

based on the first error status of the read request indicating the first uncorrectable error, identify a completion status of the retry read operation;

based on the completion status of the retry read operation indicating that the retry read operation is incomplete, determine a number of iterations of the retry read operation; and based on the number of iterations being less than a threshold number, schedule the retry read operation as the high priority operation.

12. The storage device of claim 8, wherein the first layer comprises an application layer, and wherein the second layer comprises at least one memory manager.

13. The storage device of claim 8, wherein the at least one retry read offset corresponds to at least one page type associated with the storage device.

14. The storage device of claim 13, wherein the at least one page type includes at least one of Single Level-Cell (SLC), Least Significant Bit (LSB), Central Significant Bit (CSB), Extended Significant Bit (ESB) and Most Significant Bit (MSB).

15. A system, comprising:

a host device configured to transmit a command; and a storage device including a memory and a storage controller, the storage controller operatively coupled to the memory, the storage controller being configured to:

based on receiving the command from the host device, generate a read request using a first layer associated with the storage device, wherein the read request comprises at least one memory physical parameter, a default read offset, and at least one retry read offset, communicate, via a memory interface layer, the read request to a second layer associated with the storage device, based on receiving the read request from the first layer, perform a default read operation in the second layer based on the at least one memory physical parameter and the default read offset, detect a first error status of the read request during the default read operation in the second layer, wherein the first error status of the read request indicates a first uncorrectable error or a first correctable error, and based on the first error status of the read request indicating the first uncorrectable error, perform a retry read operation in the second layer using a retry read offset from among the at least one retry read offset.

16. The system of claim 15, wherein the storage controller is further configured to:

detect a second error status of the read request during the retry read operation in the second layer, wherein the second error status of the read request indicates a second uncorrectable error or a second correctable error; and based on the second error status of the read request during the retry read operation indicating the second uncorrectable error, perform another retry read operation in the second layer using another retry read offset from among the at least one retry read offset.

17. The system of claim 15, wherein to detect the first error status of the read request during the default read operation, the storage controller is further configured to:

read data from the storage device by issuing a data output command to an Error Correction Code (ECC) engine from the second layer of the storage device;

determine, using the ECC engine, a number of bit flips in data which is read from the storage device;

based on the number of bit flips being greater than a threshold number, detect the first error status of the read request as a first uncorrectable error status, wherein the first uncorrectable error status indicates the first uncorrectable error in the data which is read from the storage device; and based on the number of bit flips being less than or equal to the threshold number, detect the first error status of the read request as a first correctable error status, wherein the first correctable error status indicates the first correctable error in the data which is read from the storage device.

18. The system of claim 15, wherein the storage controller is further configured to schedule the retry read operation as a high priority operation, and wherein to schedule the retry read operation as the high priority operation, the storage controller is further configured to:

based on the first error status of the read request indicating the first uncorrectable error, identify a completion status of the retry read operation;

based on the completion status of the retry read operation indicating that the retry read operation is incomplete, determine a number of iterations of the retry read operation; and based on the number of iterations being less than a threshold number, schedule the retry read operation as the high priority operation.

19. The system of claim 15, wherein the first layer comprises an application layer, and wherein the second layer comprises at least one memory manager.

20. The system of claim 15, wherein the at least one retry read offset corresponds to at least one page type associated with the storage device.

\* \* \* \* \*